(12) United States Patent
Bruekers et al.

(10) Patent No.: US 7,109,741 B2
(45) Date of Patent: *Sep. 19, 2006

(54) IMAGE DATA DISPLAY ON AN INFORMATION CARRIER

(75) Inventors: Alphons Antonius Maria Lambertus Bruekers, Eindhoven (NL); Antonius Hermanus Maria Akkermans, Eindhoven (NL); Josephus Arnoldus Henricus Maria Kahlman, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/536,849

(22) PCT Filed: Nov. 28, 2003

(86) PCT No.: PCT/IB03/05576

§ 371 (c)(1),
(2), (4) Date: May 31, 2005

(87) PCT Pub. No.: WO2004/051655

PCT Pub. Date: Jun. 17, 2004

(65) Prior Publication Data

US 2006/0072904 A1   Apr. 6, 2006

(30) Foreign Application Priority Data

Dec. 4, 2002   (EP) ................... 02292998

(51) Int. Cl.
*G01R 31/00*   (2006.01)
(52) U.S. Cl. .................................... 324/770
(58) Field of Classification Search ............... None
See application file for complete search history.

(56) References Cited

U.S. PATENT DOCUMENTS 6,549,503 B1 *   4/2003   Matos .................. 720/600

FOREIGN PATENT DOCUMENTS

JP         11-250644       9/1999

\* cited by examiner

*Primary Examiner*—Jermele Hollington
*Assistant Examiner*—Trung Q Nguyen

(57) ABSTRACT

The invention relates to an information carrier (101) intended to be put into a rotary motion, said information carrier (101) comprising: display means (102) designed to display image data, said display means (102) being spatially located by a spatial position, processing means (103) for periodically sending to said display means (102) image data having the same spatial position as said display means (102). Use: Optical disc/Optical disc player.

7 Claims, 3 Drawing Sheets

IMAGE DATA DISPLAY ON AN INFORMATION CARRIER

FIELD OF THE INVENTION

The invention relates to an information carrier intended to be put into a rotary motion.

The invention also relates to a player apparatus for playing such an information carrier.

The invention may be used in the field of optical discs for displaying a still image on an optical disc in a player apparatus.

This application is a 371 of PCT/IB03/05576, Nov. 28, 2003.

BACKGROUND OF THE INVENTION

Information carriers such as optical discs comprise visual data mapped on the surface opposite to the reading surface. In particular, visual data may correspond to the label of the record or the table of contents (TOC). These data are only visible to a user when the disc is not rotating.

The Japanese Patent published under number 11-250644 describes a disc player comprising means which allow to see the label of a disc when rotating. To this end, the player comprises means for flashing a label face once per revolution so that the label can be seen as an apparently still image by making the afterimage continuous. The property of the human eyes to integrate visual information is used.

The disc player as described in the prior art document has technical limitations.

The use of flashing means takes up a lot a space in the player, so that this solution cannot be used in consumer products such as disc players of reduced size.

Moreover, flashing means are power consuming.

Finally, flashing means only allow a user to see an image that was previously printed on the disc.

OBJECT AND SUMMARY OF THE INVENTION

It is an object of the invention to propose an information carrier that provides a display of an apparently still image when rotating.

To this end, the information carrier comprises:
display means designed to display image data, said display means being spatially located by a spatial position,
processing means for periodically sending to said display means image data having the same spatial position as said display means.

The periodic sending of image data allows to obtain a continuous afterimage so that the displayed image appears to be still to a user looking at the disc player. This invention is based on the property of the human eye of integrating visual information, but compared with the prior art, means for obtaining an apparently still image are directly put on the disc itself. Thus, such a solution does not need flashing means, which allows to reduce the size of a player apparatus intended to play an information carrier according to the invention.

In a preferred embodiment, the information carrier comprises a memory device for storing said image data.

This memory device can store image data concerning the information carrier such as, for example, the disc label, the TOC, or an image of the performer.

In a preferred embodiment, the information carrier comprises contactless means for receiving said image data from an information carrier player apparatus.

This feature can personalize and change the content of the displayed image on the disc. For example, a CD audio information carrier may receive colored patterns that change in accordance with the music, or any image data (or a sequence of image data) sent by the player apparatus.

In a preferred embodiment, the information carrier comprises calculation means for calculating the angular position of said display means, and/or contactless means for receiving said angular position from an information carrier player apparatus.

The absolute spatial position of the display means is defined by its angular position.

If the calculation means for calculating the angular position are implemented in the information carrier, the data exchange with the player apparatus is limited, which allows to decrease the complexity of such an apparatus and eases the use of information carriers according to the invention in existing player apparatuses.

If the calculation means for calculating the angular position are implemented in the player apparatus, the cost of information carriers according to the invention is reduced.

In a preferred embodiment, the display means of the information carrier are arranged along a radial direction of the information carrier.

Considering that the information carrier has a rotary motion, this arrangement of the display means is advantageous because a plurality of pixels can be displayed at the same time.

In a preferred embodiment, the display means of the information carrier correspond to a polymer LED display or to a LCD display.

This type of display can reproduce the content of the image data while ensuring an easy addressing and/or a small thickness of the information carrier. If these displays correspond to LCD displays, the power consumption is reduced significantly.

The invention also relates to an information carrier player apparatus comprising contactless means for sending image data to an information carrier as previously described.

In a preferred embodiment, the player apparatus comprises calculation means for calculating the angular position of said display means and contactless means for sending said angular position to the information carrier described above.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
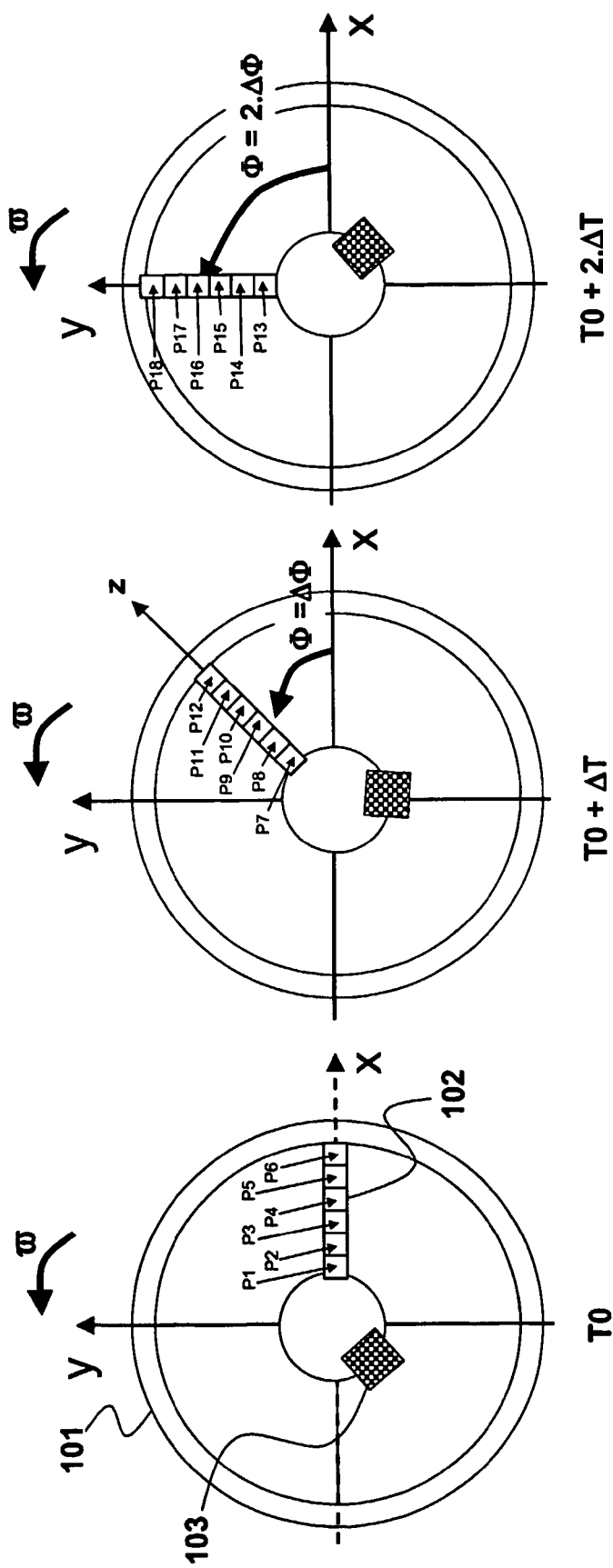
FIG. 1 depicts an information carrier according to the invention at different time intervals.

FIG. 1 depicts the structure of an information carrier 101 according to the invention, said information carrier being intended to be put into a rotary motion. This information carrier corresponds, for example, to a CD Audio, a DVD, or any other optical disc. This information is shown at different time intervals.

The information carrier 101 comprises display means 102 for displaying digital image data. The display means 102, interdependent with the information carrier 101, are mapped on a surface of the information carrier 101 so that the reading operation performed by a laser beam is not disturbed. The display means 102 are spatially located and identified by a spatial position, defined in particular by the angle $\phi$ between the horizontal axis (x) and the axis (z) of the displays means. Axis (x) and (y) form reference axes. In this embodiment, display means 102 comprise only six elementary display areas to ease the understanding of the invention, but displays having a higher number of elementary pixel areas may be used. Each elementary pixel display is located with a radius value $r_i$.

The information carrier 101 comprises processing means for periodically sending to the display means, image data having the same spatial position as said display means during the rotation of the information carrier at an angular speed $\omega$ rad/s. Such processing means are preferably implemented in a integrated circuit 103 placed in a position where the normal read/write operations of the disc are not disturbed. Advantageously, the integrated circuit is placed close to the central hole of the information carrier in order to avoid mechanical unbalance. When placed between the clamping area and the information area, where the reflective mirror of the disc can be left out, the position of the chip can be detected optically.

Figure 3:
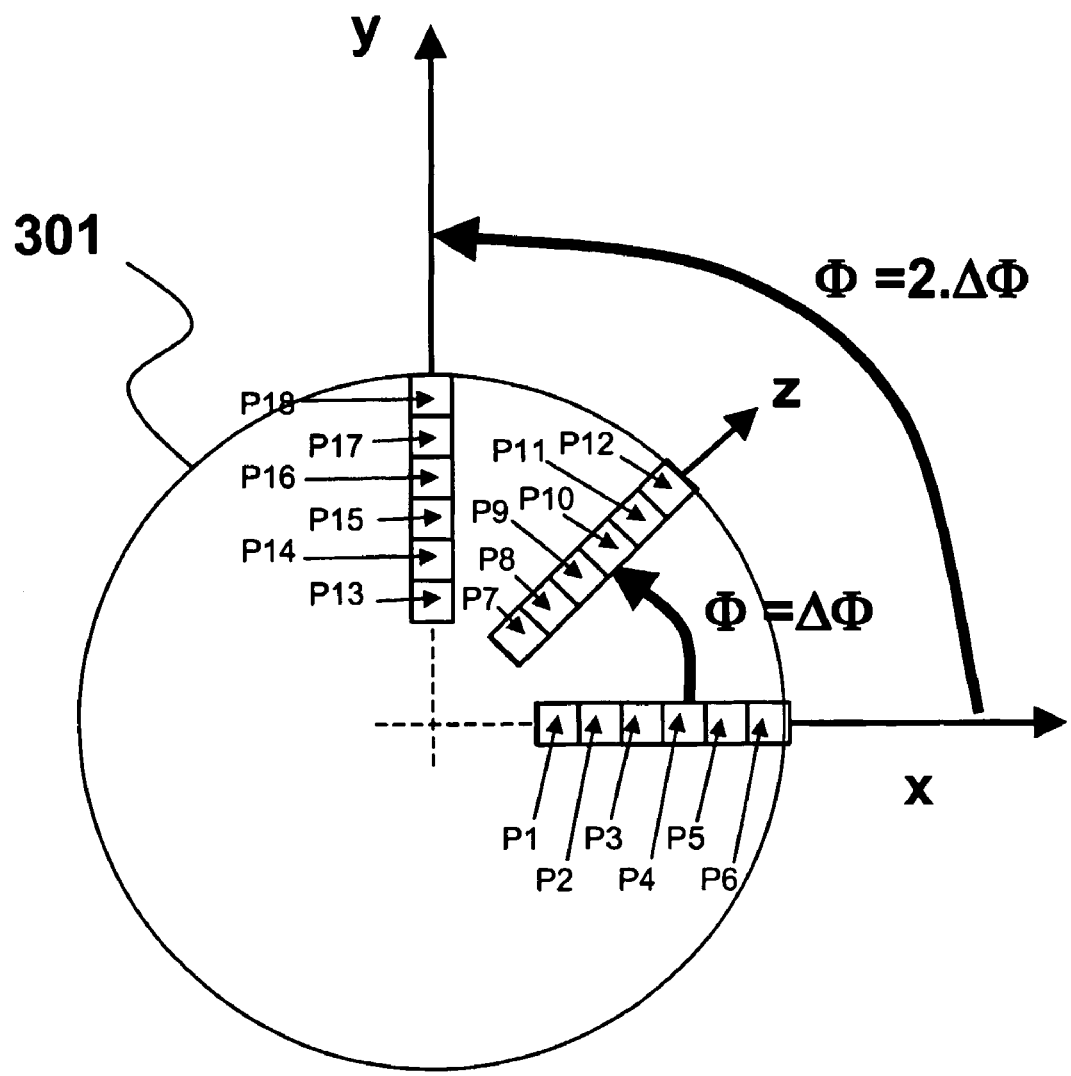
FIG. 3 depicts an image to be displayed on an information carrier according to the invention.

Let us suppose that the circular image 301 as depicted in FIG. 3 is to be displayed on display means 102. This image 301 is composed of a plurality of image data (i.e. pixels) advantageously located in the image plane with polar coordinates.

Over a period equal to $\Delta T$ ($\Delta T=\Delta\Phi/\omega$), image data of image IMA having the same spatial position (i.e. same angle and same radius $r_i$ in the image plan) as the spatial position $\phi$ of the display means are displayed. For example, at time T0 pixels (P1, P2, P3, P4, P5, P6) are displayed on the display means 102, at time (T0+$\Delta T$) pixels (P7, P8, P9, P10, P11, P12), at time (T0+2.$\Delta T$) pixels (P13, P14, P15, P16, P17, P18), etc . . . This successive display of image data performed over a very small time interval $\Delta T$ creates a continuous afterimage.

The display means 102 correspond to a LED display (light-emitting diode) having the characteristic of being thin, flexible, and of small mass. Such a display is arranged in a rectangular pattern placed on the information carrier according to a radial direction (z), as shown in FIG. 1.

The display means 102 correspond to a LED display (light-emitting diode) having the characteristic of being thin, flexible, and of small mass. In particular, the display advantageously is a Polymer LED display known as PolyLED display. A reflective Liquid Crystal Display (LCD) being thin and of small mass may also be used, but must be illuminated externally.

Figure 2:
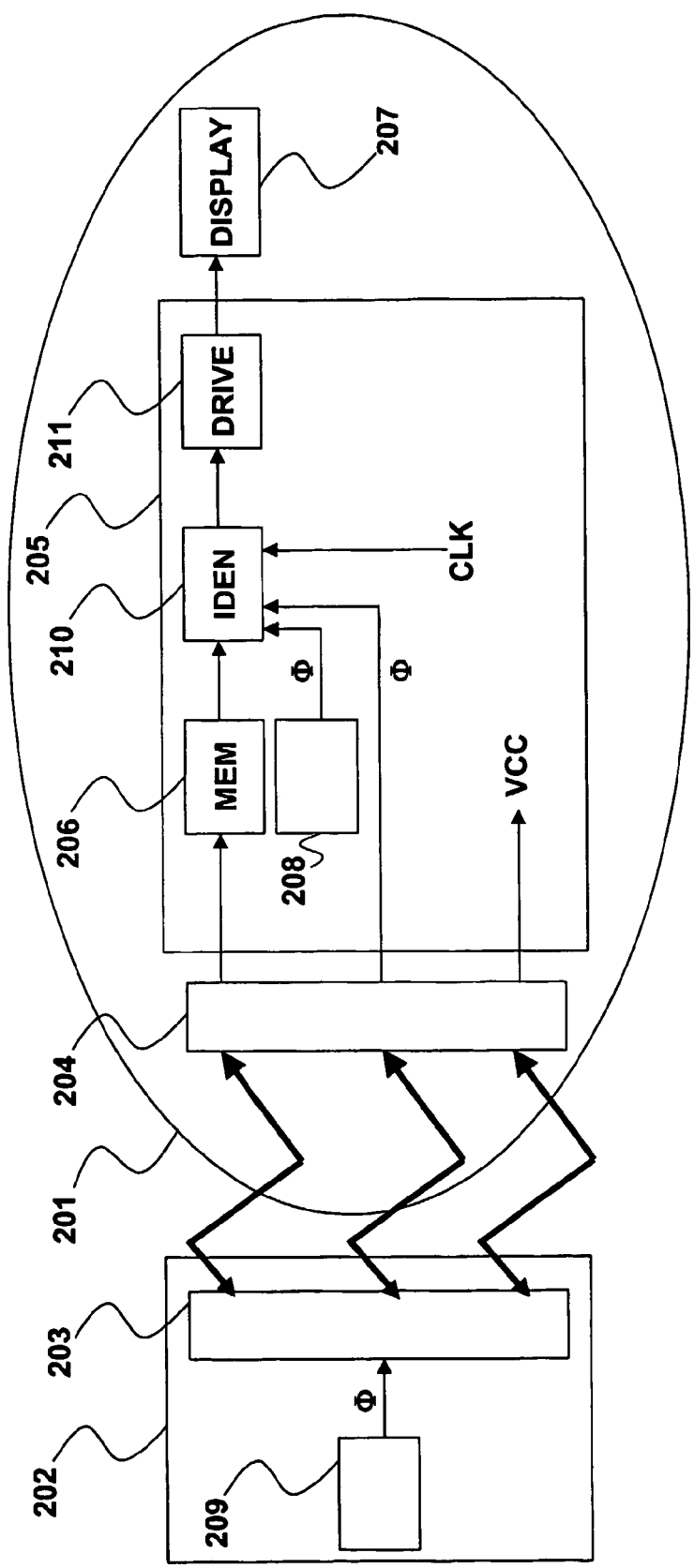
FIG. 2 depicts the processing means implemented in an information carrier according to the invention and processing means implemented in the player apparatus according to the invention in which the information carrier is intended to be inserted.

FIG. 2 depicts the processing means implemented in an information carrier 201 according to the invention and processing means implemented in the player apparatus 202 in which the information carrier 201 is intended to be inserted and played.

The information carrier 201 and the player apparatus 202 communicate by contactless means 203 and 204. Contactless means 203 are implemented in the player apparatus, while contactless means 204 are implemented in the integrated circuit 205 (referenced 103 in FIG. 1) and/or at its periphery. Various technological approaches may be used for implementing such contactless means:

- inductive approach: using alternating magnetic flux at a few MHz (typically 13.56 MHz) sent by a coil implemented in the player apparatus and received by a coil implemented in the information carrier,
- capacitive approach: using an alternating electrical flux of high voltage and antenna plates in both the information carrier and the player apparatus,
- RF (radio frequency) approach: using electro magnetic radiation at high frequencies (a few GHz) with an antenna in the player apparatus, with or without an antenna implemented in the information carrier,
- optical coupling approach.

The integrated circuit 205 comprises a memory device 206 for storing the image data to be displayed on the display 207. The image data may be initially stored by the publisher of the information carrier (ROM memory may be advantageously used in this case), or received in real-time by contactless receiving means 203–204 from the player apparatus (RAM memory may be advantageously used in this case), or programmed in a non-volatile memory (EEPROM, MRAM) by the user. Image data may either be stored using polar coordinates, or Cartesian (processing means being needed in this case to get polar coordinates). Image data may either be in a raw format (such as bitmap), or alternatively in a coded format (such as JPEG format). In this latter case, the information carrier comprises decoding means (not represented) for decoding such coded image data.

Image data may correspond, for example, to patterns whose colors change in accordance with the music played, or any other information intended to be looked at by a user (text, images, graphics, sequence of images, updated TOC, or movies).

The absolute angular position $\phi$ of the information carrier 201 can be determined by calculation means 208 comprised in the chip 205, or alternatively determined by calculation means 209 comprised in the player apparatus. In this latter case, the angular position $\phi$ is sent to the information carrier by contactless means 203–204 from the player apparatus. Various technological approaches may be used for determining the absolute angular position $\phi$:

- optical detection of the position of the display 207 via the disc read-out spot (optical marker at read side of the information carrier),
- from the wobble addresses of the information carrier,
- optical detection of the position of the display 207 via extra detection means (optical or magnetic means used as a proximity detector) in the player,
- using the rotation motor tacho intended to put the information carrier into a rotation,
- using a one Pulse Per Rotation signal (1PPO) obtained by the display or integrated circuit, e.g. by on-chip detection by an integrated photodiode of a stationary light spot.

The processing means 210 are applied to image data stored in memory 206. They correspond in particular to code instructions of a software program executed by a signal processor embedded in the chip 205. The processing means

210 receive an absolute angular position φ for identifying which pixels of the image must be sent to the display, as well as a clock signal CLK indicating at which frequency f these pixels have to be identified (f=1/ΔT).

At a given time, the pixels identified by processing means 210 are sent to a display driver 211 in charge of driving the display 207 (addressing operation, data buffering . . . ).

The power VCC for all processing and display means implemented in the information carrier 201 is supplied by contactless means 203–204 or by an on-disc battery.

The invention claimed is:

1. An information carrier intended to be put into a rotary motion, said information carrier comprising:
   display means for displaying image data, said display means being attached to said information carrier and being spatially located in a spatial position; and
   processing means, attached to said information carrier, for periodically sending, to said display means, image data having the same spatial position as said display means.

2. The information carrier as claimed in claim 1, wherein said information carrier further comprises a memory device for storing said image data.

3. An information carrier intended to be put into a rotary motion, said information carrier comprising:
   display means for displaying image data, said display means being spatially located in a spatial position;
   processing means for periodically sending, to said display means, image data having the same spatial position as said display means, wherein said information carrier further comprises contactless means for receiving said image data from an information carrier player apparatus.

4. The information carrier as claimed in claim 3, wherein said information carrier further comprises calculation means for calculating an angular position of said display means, or wherein said angular position is received by said contactless means from said information carrier player apparatus.

5. An information carrier intended to be put into a rotary motion, said information carrier comprising:
   display means for displaying image data, said display means being spatially located in a spatial position;
   processing means for periodically sending, to said display means, image data having the same spatial position as said display means, wherein said display means is arranged along a radial direction of the information carrier.

6. An information carrier intended to be put into a rotary motion, said information carrier comprising:
   display means for displaying image data, said display means being spatially located in a spatial position;
   processing means for periodically sending, to said display means, image data having the same spatial position as said display means, wherein said display means is formed by a polymer LED display or a LCD display.

7. A player apparatus for playing an information carrier intended to be put into a rotary motion, said information carrier comprising:
   display means for displaying image data, said display means being spatially located in a spatial position;
   proccessing means for periodically sending, to said display means, image data having the same spatial position as said display means, wherein said player apparatus comprises contactless means for sending image data to said information carrier.

* * * * *